US010252252B2

(12) United States Patent
Bauer et al.

(10) Patent No.: US 10,252,252 B2
(45) Date of Patent: Apr. 9, 2019

(54) ZEOLITE PROMOTED V/TIW CATALYSTS

(71) Applicant: Johnson Matthey Public Limited Company, London (GB)

(72) Inventors: Juergen Bauer, Lichtenfels (DE); Ralf Dotzel, Nuremberg (DE); Joerg Jodlauk, St. Wendel (DE); Rainer Leppelt, Lichtenfels (DE); Joerg Muench, Lichtenfels (DE); Irene Piras, Bamberg (DE); Gudmund Smedler, Bleket (SE)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/422,074

(22) PCT Filed: Aug. 16, 2013

(86) PCT No.: PCT/GB2013/052181
§ 371 (c)(1),
(2) Date: Feb. 17, 2015

(87) PCT Pub. No.: WO2014/027207
PCT Pub. Date: Feb. 20, 2014

(65) Prior Publication Data
US 2015/0224486 A1    Aug. 13, 2015

Related U.S. Application Data

(60) Provisional application No. 61/684,352, filed on Aug. 17, 2012.

(51) Int. Cl.
| | |
|---|---|
| *B01J 29/88* | (2006.01) |
| *B01J 29/076* | (2006.01) |
| *B01J 37/02* | (2006.01) |
| *B01J 37/04* | (2006.01) |
| *B01J 23/847* | (2006.01) |
| *B01J 35/00* | (2006.01) |
| *B01J 29/46* | (2006.01) |
| *B01J 29/65* | (2006.01) |
| *B01J 29/68* | (2006.01) |
| *B01J 29/70* | (2006.01) |
| *B01J 29/76* | (2006.01) |
| *B01J 37/00* | (2006.01) |
| *B01D 53/94* | (2006.01) |
| *B01J 23/22* | (2006.01) |
| *B01J 23/30* | (2006.01) |
| *B01J 29/48* | (2006.01) |

(Continued)

(52) U.S. Cl.
CPC .......... *B01J 29/88* (2013.01); *B01D 53/9418* (2013.01); *B01D 53/9436* (2013.01); *B01J 23/22* (2013.01); *B01J 23/30* (2013.01); *B01J 23/40* (2013.01); *B01J 23/8472* (2013.01); *B01J 29/076* (2013.01); *B01J 29/46* (2013.01); *B01J 29/48* (2013.01); *B01J 29/65* (2013.01); *B01J 29/68* (2013.01); *B01J 29/69* (2013.01); *B01J 29/7007* (2013.01); *B01J 29/7615* (2013.01); *B01J 29/7815* (2013.01); *B01J 35/0006* (2013.01); *B01J 35/04* (2013.01); *B01J 37/0009* (2013.01); *B01J 37/0246* (2013.01); *B01J 37/04* (2013.01); *B01D 53/9468* (2013.01); *B01D 53/9477* (2013.01); *B01D 2251/2062* (2013.01); *B01D 2255/102* (2013.01); *B01D 2255/20707* (2013.01); *B01D 2255/20723* (2013.01); *B01D 2255/20738* (2013.01); *B01D 2255/20776* (2013.01); *B01D 2255/50* (2013.01); *B01D 2255/502* (2013.01); *B01D 2255/504* (2013.01); *B01D 2255/915* (2013.01); *B01D 2255/9155* (2013.01); *B01D 2258/012* (2013.01); *B01J 29/40* (2013.01); *B01J 2229/186* (2013.01); *B01J 2229/42* (2013.01)

(58) Field of Classification Search
None
See application file for complete search history.

(56) References Cited

U.S. PATENT DOCUMENTS

| | | | | |
|---|---|---|---|---|
| 1,558,598 A | * | 10/1925 | Carleton | ............... C01B 21/265 423/392 |
| 4,564,604 A | | 1/1986 | Iida et al. | |

(Continued)

FOREIGN PATENT DOCUMENTS

| | | |
|---|---|---|
| DE | 19806062 A1 | 8/1999 |
| DE | 102006031661 A1 | 1/2008 |

(Continued)

OTHER PUBLICATIONS

Perez-Ramirez et al., "Evolution of Isomorphously Substituted Iron Zeolites During Activation: Comparison of Fe-beta and Fe-ZSM-5", Journal of Catalysis 232(2) 2005 pp. 318-334.

(Continued)

*Primary Examiner* — Sheng H Davis

(57) ABSTRACT

Provided is a catalyst composition for treating exhaust gas comprising a blend of a first component and second component, wherein the first component is an aluminosilicate or ferrosilicate molecular sieve component wherein the molecular sieve is either in H+ form or is ion exchanged with one or more transition metals, and the second component is a vanadium oxide supported on a metal oxide support selected from alumina, titania, zirconia, cella, silica, and combinations thereof. Also provided are methods, systems, and catalytic articles incorporating or utilizing such catalyst blends.

10 Claims, 3 Drawing Sheets

(51) Int. Cl.
  *B01J 29/69* (2006.01)
  *B01J 29/78* (2006.01)
  *B01J 35/04* (2006.01)
  *B01J 23/40* (2006.01)
  *B01J 29/40* (2006.01)

(56) References Cited

U.S. PATENT DOCUMENTS

| | | | |
|---|---|---|---|
| 4,663,300 A | 5/1987 | Lester et al. | |
| 4,735,927 A | 4/1988 | Gerdes et al. | |
| 4,798,813 A | 1/1989 | Kato et al. | |
| 4,855,115 A | 8/1989 | Imanari et al. | |
| 4,961,917 A | 10/1990 | Byrne | |
| 5,085,840 A | 2/1992 | Held et al. | |
| 5,116,586 A | 5/1992 | Baacke et al. | |
| 5,409,681 A | 4/1995 | Kato et al. | |
| 7,476,638 B2 | 1/2009 | Chester et al. | |
| 7,485,272 B2 * | 2/2009 | Driscoll | B01D 53/90 422/105 |
| 8,078,748 B2 | 12/2011 | Matsumoto | |
| 8,220,254 B2 | 7/2012 | Doring | |
| 8,722,000 B2 * | 5/2014 | Boorse | F01N 3/0222 423/213.2 |
| 8,883,100 B2 | 11/2014 | Paulus et al. | |
| 2002/0004446 A1 | 1/2002 | Fischer et al. | |
| 2009/0087367 A1 * | 4/2009 | Liu | B01D 53/8634 423/237 |
| 2009/0126353 A1 * | 5/2009 | Han | B01D 53/9436 60/297 |
| 2009/0143225 A1 * | 6/2009 | Ha | B01D 53/8628 502/247 |
| 2009/0155152 A1 * | 6/2009 | Naraki | B01D 53/9418 423/239.1 |
| 2010/0058746 A1 * | 3/2010 | Pfeifer | B01D 53/9468 60/297 |
| 2010/0111796 A1 * | 5/2010 | Caudle | B01D 53/9468 423/239.2 |
| 2010/0236224 A1 * | 9/2010 | Kumar | B01D 53/9477 60/297 |
| 2010/0284875 A1 * | 11/2010 | Koermer | B01D 53/9409 423/237 |
| 2011/0047989 A1 * | 3/2011 | Choung | F01N 3/035 60/297 |
| 2011/0162349 A1 * | 7/2011 | Cheng | F01N 3/023 60/274 |
| 2011/0274607 A1 * | 11/2011 | Reddy | B01D 53/8628 423/239.2 |
| 2012/0042631 A1 * | 2/2012 | Schmieg | B01D 53/9463 60/274 |
| 2012/0207669 A1 | 8/2012 | Naraki et al. | |
| 2013/0004391 A1 * | 1/2013 | Pfeifer | B01D 53/9468 423/213.2 |

FOREIGN PATENT DOCUMENTS

| | | |
|---|---|---|
| DE | 102007061005 A1 | 6/2009 |
| DE | 102008055890 A1 | 5/2010 |
| DE | 102011012799 A1 | 3/2012 |
| DE | 102008009672 B4 | 2/2016 |
| EA | 008338 B1 | 8/2006 |
| EP | 0219854 A2 | 4/1987 |
| EP | 0255121 A2 | 2/1988 |
| EP | 0544282 A1 | 11/1992 |
| EP | 1609962 A1 | 12/2005 |
| EP | 1992409 * | 4/2008 |
| EP | 2072128 A1 | 6/2009 |
| JP | 55003872 A1 | 1/1980 |
| JP | S61171539 A | 8/1986 |
| JP | 2007527314 A1 | 9/2007 |
| JP | 5146634 A | 7/2008 |
| JP | 2010502418 A | 1/2010 |
| RU | 2370308 C1 | 8/2009 |
| RU | 2406567 C1 | 12/2010 |
| WO | 198802659 A1 | 4/1988 |
| WO | 9939809 A1 | 8/1998 |
| WO | 2005047663 A2 | 5/2005 |
| WO | 200707889 A1 | 1/2007 |
| WO | 2008026002 A1 | 3/2008 |
| WO | 200885280 A2 | 7/2008 |
| WO | 2008089957 A1 | 7/2008 |
| WO | 2009023202 A2 | 2/2009 |
| WO | 2011128026 * | 10/2011 |
| WO | 2011128026 * | 11/2011 |
| WO | 2013017873 A1 | 2/2013 |
| WO | 2014027207 A1 | 2/2014 |

OTHER PUBLICATIONS

Lachman et al.; Extruded Monolithic Catalyst Supports; Catalysis Today, 14 (1992) 317-329; Elsevier Science Publishers B.V., Amsterdam.

Kröcher et al.; Combination of V2O5/WO3-TiO2, Fe-ZSM5, and Cu-ZSM5 Catalysts for the Selective Catalytic Reduction of Nitric Oxide with Ammonia; American Chemical Society; Ind. Eng. Chem. Res. 2008, 47, 8588-8593.

* cited by examiner

ZEOLITE PROMOTED V/TIW CATALYSTS

BACKGROUND

A.) Field of Use

The present invention relates to catalysts, systems, and methods that are useful for treating an exhaust gas resulting from combustion of hydrocarbon fuel, and particularly exhaust gas containing nitrogen oxides, such as an exhaust gas produced by diesel engines.

B.) Description of Related Art

The largest portions of most combustion exhaust gases contain relatively benign nitrogen ($N_2$), water vapor ($H_2O$), and carbon dioxide ($CO_2$); but the exhaust gas also contains in relatively small part noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of exhaust gas released into the atmosphere, it is desirable to eliminate or reduce the amount of these undesirable components, preferably by a process that, in turn, does not generate other noxious or toxic substances.

One of the most burdensome components to remove from a vehicular exhaust gas is $NO_x$, which includes nitric oxide (NO), nitrogen dioxide ($NO_2$), and/or nitrous oxide ($N_2O$). The reduction of $NO_x$ to $N_2$ in a lean burn exhaust gas, such as that created by diesel engines, is particularly problematic because the exhaust gas contains enough oxygen to favor oxidative reactions instead of reduction. $NO_x$ can be reduced in a diesel exhaust gas, however, by a process commonly known as Selective Catalytic Reduction (SCR). An SCR process involves the conversion of $NO_x$, in the presence of a catalyst and with the aid of a reducing agent, into elemental nitrogen ($N_2$) and water. In an SCR process, a gaseous reductant such as ammonia is added to an exhaust gas stream prior to contacting the exhaust gas with the SCR catalyst. The reductant is absorbed onto the catalyst and the $NO_x$ reduction reaction takes place as the gases pass through or over the catalyzed substrate.

Several chemical reactions occur in a selective catalytic reduction (SCR) system using $NH_3$ as reductant, all of which represent desirable reactions which reduce $NO_x$ to elemental nitrogen. The dominant reaction mechanism is represented in equation (1).

$$4NO+4NH_3+O_2 \rightarrow 4N_2+6H_2O \quad (1)$$

Competing, non-selective reactions with oxygen can produce secondary emissions or may unproductively consume $NH_3$. One such non-selective reaction is the complete oxidation of $NH_3$, represented in equation (2).

$$4NH_3+5O_2 \rightarrow 4NO+6H_2O \quad (2)$$

Furthermore, the reaction of $NO_2$ present in the $NO_x$ with $NH_3$ is considered to proceed according to reaction (3).

$$3NO_2+4NH_3 \rightarrow (7/2)N_2+6H_2O \quad (3)$$

Further, the reaction between $NH_3$ and NO and $NO_2$ is represented by reaction (4):

$$NO+NO_2+2NH_3 2N_2+3H_2O \quad (4)$$

Although the reaction rates of the reactions (1), (3) and (4) vary greatly depending on the reaction temperature and the sort of the catalyst used, that of the reaction (4) is, in general, 2 to 10 times as high as those of the reactions (1) and (3).

The application of SCR technology to treat NOx emissions from vehicular IC engines, particularly lean-burn IC engines, is well known. A typical prior art SCR catalyst disclosed for this purpose includes $V_2O_5/WO_3$ supported on $TiO_2$ (see WO 99/39809). However, in some applications the thermal durability and performance of vanadium-based catalyst may not be acceptable.

One class of SCR catalysts that has been investigated for treating $NO_x$ from internal combustion engine exhaust gas is transition metal exchanged zeolites (see WO 99/39809 and U.S. Pat. No. 4,961,917). However, in use, certain aluminosilicate zeolites such as ZSM-5 and beta zeolites have a number of drawbacks. They are susceptible to dealumination during high temperature hydrothermal ageing resulting in a loss of acidity, especially with Cu/beta and Cu/ZSM-5 catalysts; both beta- and ZSM-5-based catalysts are also affected by hydrocarbons which become adsorbed on the catalysts at relatively low temperatures and are oxidised as the temperature of the catalytic system is raised generating a significant exotherm, which can thermally damage the catalyst. This problem is particularly acute in vehicular diesel applications where significant quantities of hydrocarbon can be adsorbed on the catalyst during cold-start. And beta and ZSM-5 zeolites are also prone to coking by hydrocarbons, which reduces catalyst performance. Accordingly, there remains a need for improved catalyst for selective catalytic reduction processes.

SUMMARY OF THE INVENTION

Applicants have discovered that blending vanadium-based SCR or ASC catalysts with certain molecular sieves improves the catalytic performance that is not observed when each of these components are considered alone. In particular, catalyst of the present invention achieve improved high temperature performance, improved hydrothermal stability, high sulphur tolerance, and improved $NO_2$ tolerance compared to known SCR catalyst and ASC catalysts. Such blends preferably contain aluminosilicate or ferrosilicate molecular sieves, preferably in the H+ form or ion exchanged with a transition metal such as Fe. Preferably the molecular sieves have a framework selected from MFI, BEA, or FER.

Accordingly, provided is a catalyst composition for treating exhaust gas comprising a blend of a first component and second component, wherein the first component is an aluminosilicate or ferrosilicate molecular sieve component wherein the molecular sieve is either in H+ form or is ion exchanged with one or more transition metals, and the second component is a vanadium oxide supported on a metal oxide support selected from alumina, titania, zirconia, ceria, silica, and combinations thereof. According to another aspect of the invention, provided is a catalytic washcoat comprising a catalyst blend as described herein.

According to another aspect of the invention, provided is a catalytic article, preferably an extruded flow-through honeycomb, comprising a catalyst blend as described herein.

According to yet another aspect of the invention, provided is a method for treating $NO_x$ or $NH_3$ in an exhaust gas, such as an exhaust gas generated by a diesel internal combustion engine, wherein the method involves contacting the exhaust gas with a catalyst blend as described herein whereby the concentration of $NO_x$ or $NH_3$ in an exhaust gas is reduced.

DETAILED DESCRIPTION OF PREFERRED EMBODIMENTS OF THE INVENTION

Figure 1:
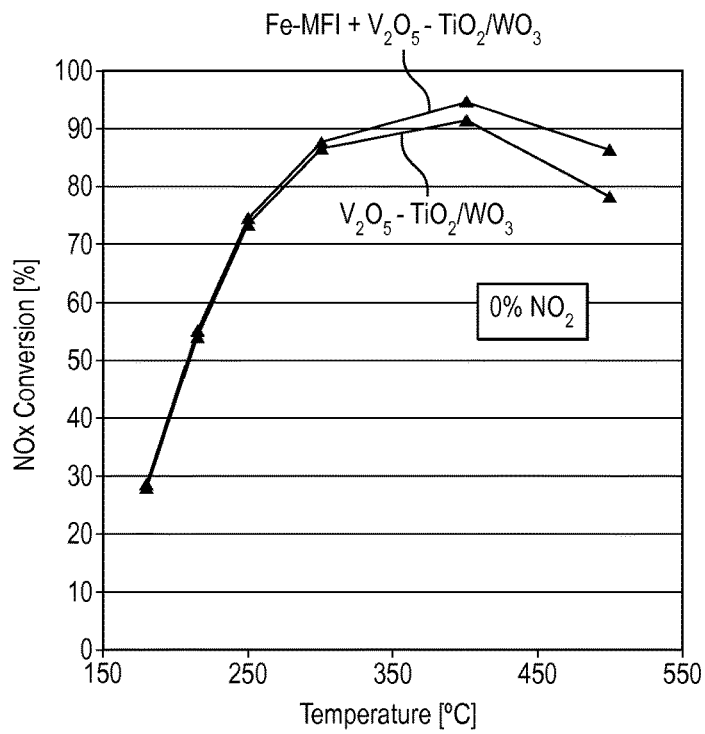
FIG. 1 is a graph depicting $NO_x$ conversion data for a fresh catalyst according to an embodiment of the present invention and comparative data for a catalyst known in the prior art.

In a preferred embodiment, the invention is directed to a catalyst for improving environmental air quality, particularly for improving exhaust gas emissions generated by diesel and other lean burn engines. Exhaust gas emissions are improved, at least in part, by reducing $NO_x$ and/or $NH_3$ slip concentrations in lean burn exhaust gas over a broad operational temperature range. Useful catalysts are those that selectively reduce $NO_x$ and/or oxidize ammonia (ammonia slip) in an oxidative environment (i.e., an SCR catalyst and/or an ASC catalyst).

According to a preferred embodiment, provided is a catalyst composition comprising a blend of (a) a molecular sieve component comprising an iron promoted aluminosilicate molecular sieve or a ferrosilicate molecular sieve (also known as an amorphous iron molecular sieve) having a framework selected from the group consisting of MFI, BEA, and FER; and (b) a vanadium component comprising one or more oxides of vanadium supported on a metal oxide support comprising titanium oxide.

As used herein, the term "blend" means an essentially uniform combination of two or more catalytic components either of which could be used alone for the same purpose as the blend. When combined in a blend, the individual catalytic components are not readily separable. And due at least in part to the synergistic nature of the combination, the catalytic effects of the constituent parts are indistinguishable from one another.

In a preferred embodiment, the catalyst composition comprises a majority of vanadium component (including metal oxide support) relative to molecular sieve component (including iron), based on weight. In certain embodiments, the catalyst composition comprises a vanadium component and a molecular sieve component in weight ratio of about 1:1 to about 99:1. Preferably, the vanadium component and molecular sieve component are present in a weight ratio of about 2:1 to about 4:1, about 5:1 to about 10:1, or about 10:1 to about 50:1. Here, the vanadium component is calculated for the weight ratio based on the amount of oxide(s) of titanium oxide, oxide(s) of vanadium, and optionally oxide(s) for tungsten that are present in the blend and does not include other, non-catalytic metal oxides that are present, if any. Non-limiting examples of non-catalytic metal oxides that might be present in the composition include binders and other types of additives such as alumina, zirconia, ceria, silica, mixtures of alumina with zirconia or ceria, ceria coated on alumina, and mixed oxides, such as (non-zeolite) silica-alumina, alumina-zirconia, alumina chromia, and alumina ceria. Binders are distinct from the catalytic metal oxides in the composition because the binders are not promoted with a metal that is catalytically active for SCR processes and/or have a much larger particle size compared to the catalytic metal oxides. One skilled in the art will also appreciate that the ratios describe the relative proportions of catalytically active components in the blend and do not account of other components such as fillers, fibrous reinforcing agents, processing aides, water, and the like that might be present in various forms of the catalyst composition such as slurries, washcoats, and extrudable pastes.

In another embodiment, the catalyst composition comprises about 60 to about 99 weight percent vanadium component and about 1 to about 40 weight percent molecular sieve component, based on the total weight of catalytically active components in the blend. In certain embodiments, the catalyst composition comprises about 60 to about 70, about 75 to about 85, or about 90 to about 97 weight percent vanadium component and about 30 to about 40, about 15 to about 25, or about 3 to about 10 weight percent molecular sieve component.

Preferred vanadium components include oxides of vanadium on a support comprising oxides of titanium and, optionally, oxides of tungsten. In certain embodiments, the oxides of titanium and the oxides of vanadium are present in a weight ratio of about 30:1 to about 2:1, more preferably from about 20:1 to about 5:1, and even more preferably from about 15:1 to about 7:1. In certain embodiments, the catalyst composition comprises up to about 25 weight percent oxides of tungsten, preferably from about 1 to about 25 weight percent, more preferably from about 5 to about 20 weight percent, and even more preferably from about 7 to about 15 weight percent based on the total weight of the vanadium component.

A preferred oxide of titanium is titanium dioxide ($TiO_2$) which is also known as titania or titanium(IV) oxide, and is preferably in the anatase form. In certain embodiments, the $TiO_2$ is at least 90 weight percent, and more preferably at least 95 weight percent, anatase form relative to the rutile form. In certain embodiments, the $TiO_2$ is chemically stabilized and/or pre-calcined, for example as an end product of sulphate processing. Such chemically stabilized $TiO_2$ displays the X-ray reflexes that are specific to the $TiO_2$ lattice in X-ray diffractometry.

Typically, the $TiO_2$ serves as a high surface area support for the oxide(s) of vanadium, which in a preferred embodiment is vanadium pentaoxide ($V_2O_5$), also known as vanadium (V) oxide or vanadia. In certain embodiments, the oxide(s) of vanadium are one or more of vanadium pentaoxide, vanadium trioxide, vanadium dioxide, or a transition metal or rare earth metal vanadate, such as iron vanadate. The support may also include oxide(s) of tungsten, preferably tungsten trioxide ($WO_3$), also known as tungsten (VI) oxide. Thus, the $V_2O_5$—$TiO_2$ or $V_2O_5$—$TiO_2$/$WO_3$ is in the form of self-supporting catalyst particles. In various embodiments, the catalytic metal oxide will have a surface area (BET) of from about 10 to about 300 $m^2/g$ or more. In certain embodiments, the $TiO_2$ or $TiO_2$/$WO_3$ will have an average particle size of about 10 to about 250 nanometers (nm), preferably about 10 to about 100 nm. Preferably the molecular sieve is an aluminosilicate, preferably without substituted metals in the framework, or a ferrosilicate. Preferred frameworks include FER, MFI, and BEA. In certain embodiments, the molecular sieve is not a small pore molecular sieve. Molecular sieves, particularly aluminosilicates, are in the H+ form or are ion exchanged with a transition metal. Preferably, the aluminosilicate is substantially free of alkali and alkaline earth metals. H+ form molecular sieves preferably are free of non-framework metals. Examples of useful transition metals include Fe, Cu, Ni, Co, Zn, and Ni, with Fe and Cu being preferred, and Fe being particularly preferred. In certain embodiments, the molecular sieve is essentially free of any non-framework metal other than Fe. Preferably, the ion exchange occurs after synthesis of the molecular sieve.

Preferred blends comprise an iron promoted molecular sieve or ferrosilicate molecular sieve having at least one framework selected from MFI, BEA, and FER. The molecular sieves can be selected from zeolites and non-zeolite materials. A zeolites is generally considered to be an aluminosilicates, whereas a non-zeolite molecular sieve is a molecular sieve having a specific zeolite crystal structure (e.g., IZA Framework Type), but instead of being an aluminosilicate, the non-zeolite molecular sieve has one or more non-aluminium/non-silicon cations present in its crystal lattice, e.g. phosphorus, iron, etc. Useful types of non-zeolite molecular sieve include silicoaluminophosphates (SAPOs) and ferrosilicates. Particularly preferred are iron-containing aluminosilicate zeolites such as Fe-containing MFI, BEA, and FER, with MFI being preferred.

Useful MFI isotypes include ZSM-5, [Fe—Si—O]-MFI, AMS-1B, AZ-1, Bor-C, Boralite, Encilite, FZ-1, LZ-105, Mutinaite, NU-4, NU-5, Silicalite, TS-1, TSZ, TSZ-III, TZ-01, USC-4, USI-108, ZBH, ZKQ-1B, and ZMQ-TB, with ZSM-5 being particularly preferred. Useful FER isotypes include Ferrierite, [Si—O]-FER, FU-9, ISI-6, Monoclinic ferrierite, NU-23, Sr-D, and ZSM-35. Useful BEA isotypes include Beta, [Ti—Si—O]-*BEA, CIT-6, and Tschernichite. Typical $SiO_2/Al_2O_3$ mole ratios for such materials are 30 to 100 and typical $SiO_2/Fe_2O_3$ mole ratios are 20 to 300 such as 20 to 100.

Preferably, the BEA framework contains either exchanged iron or is an iron isomorphous BEA molecular structure (also referred to as BEA-type ferrosilicate), with iron isomorphous BEA molecular structure being particularly preferred. In certain preferred embodiments, the BEA-type ferrosilicate molecular structure is a crystalline silicate having (1) an iron-containing BEA-framework structure that has a $SiO_2/Fe_2O_3$ mol ratio of about 20 to about 300, and/or (2) at least 80% of the contained iron as isolated iron ions $Fe^{3+}$ in a fresh state. Preferred BEA-type ferrosilicates useful in the present invention have a composition represented by following formula:

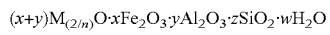

$$(x+y)M_{(2/n)}O \cdot xFe_2O_3 \cdot yAl_2O_3 \cdot zSiO_2 \cdot wH_2O$$

wherein n is an atomic value of cation M; x, y, and z represent mol fractions of $Fe_2O_3$, $Al_2O_3$ and $SiO_2$, respectively; $x+y+z=1$; w is a number of at least 0; z/x is 20 to 300, y may be 0, and optionally z/y is at least 100.

Preferably, iron-containing BEA-framework structure that has a $SiO_2/Fe_2O_3$ mol ratio of about 25 to about 300, about 20 to about 150, about 24 to about 150, about 25 to about 100, or about 50 to about 80. The upper limit of log($SiO_2/Al_2O_3$) by mol is not particularly limited, provided that the log($SiO_2/Al_2O_3$) by mol is at least 2 (i.e., the $SiO_2/Al_2O_3$ ratio by mol is at least 100). The log($SiO_2/Al_2O_3$) by mol is preferably at least 2.5 (i.e., the $SiO_2/Al_2O_3$ ratio by mol is at least 310), more preferably at least 3 (i.e., the $SiO_2/Al_2O_3$ ratio by mol is at least 1,000). When the log($SiO_2/Al_2O_3$) by mol exceeds 4 (i.e., the $SiO_2/Al_2O_3$ ratio by mol becomes at least 10,000).

In certain embodiments, the Fe-BEA aluminosilicate molecular sieve is pre-aged. Pre-aged Fe-BEA aluminosilicate can produce results substantially better than conventional Fe-BEA. Accordingly, instead of the more conventional processing of aging at 500° C. for 1 hour, the Fe-BEA aluminosilicate is preferably aged at 600-900° C., preferably 650-850° C., more preferably 700-800° C., and even more preferably 725-775° C., for 3-8 hours, preferably 4-6 hours, more preferably from 4.5-5.5 hours, and even more preferably from 4.75-5.25 hours. Embodiments using pre-aged Fe-BEA aluminosilicate are advantageous in applications in which the formation of $N_2O$ is undesirable.

In certain embodiments, the iron is present in the molecular sieve material at a concentration of about 0.1 to about 10 weight percent (wt %) based on the total weight of the molecular sieve, for example from about 0.5 wt % to about 5 wt %, from about 0.5 to about 1 wt %, from about1 to about 5 wt %, about 2 wt % to about 4 wt %, and about 2 wt % to about 3 wt %. Iron may be incorporated into the molecular sieves for use in the present invention using techniques well known in the art, including liquid-phase exchange or solid-ion exchange or by an incipient wetness process. Such materials are referred to herein as iron-containing or iron-promoted molecular sieves. For manufacture of iron-containing aluminosilicate zeolites see Journal of Catalysis 232(2) 318-334 (2005); EP2072128; and WO2009/023202 which are incorporated herein by reference.

The catalyst composition of the present invention can be prepared by blending the vanadium component and the molecular sieve component. The type blending technique is not particularly limited. In certain embodiments, a $TiO_2/WO_3$ suspension is prepared to which $V_2O_5$ powder and iron-promoted molecular sieve powder are added. The resulting suspension can be formulated as a washcoat or can be dried and calcined in a powder form which is then used to prepare a washcoat or an extrudable material.

The catalytic zeolites described herein can promote the reaction of a reductant, preferably ammonia, with nitrogen oxides to selectively form elemental nitrogen ($N_2$) and water ($H_2O$) vis-à-vis the competing reaction of oxygen and ammonia. In one embodiment, the catalyst can be formulated to favor the reduction of nitrogen oxides with ammonia (i.e., and SCR catalyst). In another embodiment, the catalyst can be formulated to treat ammonia that is not consumed in the SCR catalyst reaction (i.e. the ammonia slip). Here, the ammonia slip catalyst (ASC) is formulated to favor the oxidation of ammonia with oxygen. In yet another embodiment, an SCR catalyst and an ASC catalyst are used in series, wherein both catalysts comprise the catalyst blend described herein, and wherein the SCR catalyst is upstream of the ASC catalyst.

In certain embodiments, the ASC catalyst is disposed as a top layer on an oxidative under-layer, wherein the under-layer comprises a platinum group metal (PGM) catalyst or a non-PGM catalyst. In certain embodiments, the ASC catalyst is an extruded honeycomb brick or applied to a substrate, preferably substrates that are designed to provide large contact surface with minimal backpressure, such as flow-through metallic or cordierite honeycombs. For example, a preferred substrate has between about 25 and about 300 cells per square inch (CPSI) to ensure low backpressure. Achieving low backpressure is particularly important to minimize the ASC catalyst's effect on the low-pressure EGR performance. The ASC catalyst can be applied to the substrate as a washcoat, preferably to achieve a loading of about 0.3 to 3.5 g/in³. To provide further $NO_x$ conversion, the front part of the substrate can be coated with just SCR coating, and the rear coated with SCR and ASC catalyst which can further include Pt or Pt/Pd on an alumina support.

According to another aspect of the invention, provided is a method for the selective catalytic reduction of $NO_x$ compounds or oxidation of $NH_3$ in an exhaust gas, which comprises contacting the exhaust gas with a catalyst blend described herein for a time sufficient to reduce the level of $NO_x$ and/or $NH_3$ compounds in the exhaust gas. In certain embodiments, nitrogen oxides are reduced in the presence of a catalyst blend with the reducing agent at a temperature of at least about 100° C. In certain embodiments, $NO_x$ compounds are reduced at a temperature of about 200° C. to about 650° C. Embodiments utilizing temperatures greater than about 450° C. are particularly useful for treating exhaust gases from a heavy and light duty diesel engines that are equipped with an exhaust system comprising (optionally catalyzed) diesel particulate filters which are regenerated actively, e.g. by injecting hydrocarbon into the exhaust system upstream of the filter, wherein the zeolite catalyst for use in the present invention is located downstream of the filter. In other embodiments, the molecular sieve SCR catalyst is incorporated on a filter substrate. Methods of the present invention may comprise one or more of the following steps: (a) accumulating and/or combusting soot that is in contact with the inlet of a catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reducing agent to reduce the $NO_x$ concentration in the exhaust gas; and (f) contacting the exhaust gas with an ASC catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine. The reductant (also known as a reducing agent) for SCR processes broadly means any compound that promotes the reduction of $NO_x$ in an exhaust gas. Examples of reductants useful in the present invention include ammonia, hydrazine or any suitable ammonia precursor, such as urea $((NH_2)_2CO)$, ammonium carbonate, ammonium carbamate, ammonium hydrogen carbonate or ammonium formate, and hydrocarbons such as diesel fuel, and the like. Particularly preferred reductant, are nitrogen based, with ammonia being particularly preferred. In certain embodiments, the reductant can be a hydrocarbon, such as methane, diesel fuel, or the like.

In certain embodiments, all or at least a portion of the nitrogen-based reductant, particularly $NH_3$, can be supplied by a $NO_x$ adsorber catalyst (NAC), a lean $NO_x$ trap (LNT), or a $NO_x$ storage/reduction catalyst (NSRC), disposed upstream of the SCR catalyst, e.g., a SCR catalyst of the present invention disposed on a wall-flow filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 $g/ft^3$, such as 20 to 60 $g/ft^3$. Alternatively, the precious metal of the catalyst is characterized by the average concentration which may be from about 40 to about 100 grams/$ft^3$.

Under certain conditions, during the periodically rich regeneration events, $NH_3$ may be generated over a $NO_x$ adsorber catalyst. The SCR catalyst downstream of the $NO_x$ adsorber catalyst may improve the overall system $NO_x$ reduction efficiency. In the combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

In other embodiments, a nitrogenous reducing agent or precursor thereof, is introduced into the exhaust gas flow stream, preferably upstream of an SCR catalyst and downstream of a diesel oxidation catalyst. The introduction of this reducing agent can be accomplished by an injector, spray nozzle, or similar device.

Methods of the present invention can be performed on an exhaust gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a vehicular lean burn internal combustion engine, such as a diesel engine, a lean-burn gasoline engine or an engine powered by liquid petroleum gas or natural gas.

According to a further aspect, the invention provides an exhaust system for a vehicular lean burn internal combustion engine, which system comprising a conduit for carrying a flowing exhaust gas, a source of nitrogenous reductant, and a catalyst blend described herein. The system can include a controller for the metering the nitrogenous reductant into the flowing exhaust gas only when it is determined that the catalyst blend is capable of catalyzing $NO_x$ reduction at or above a desired efficiency, such as at above 100° C., above 150° C. or above 175° C. The determination by the control means can be assisted by one or more suitable sensor inputs indicative of a condition of the engine selected from the group consisting of: exhaust gas temperature, catalyst bed temperature, accelerator position, mass flow of exhaust gas in the system, manifold vacuum, ignition timing, engine speed, lambda value of the exhaust gas, the quantity of fuel injected in the engine, the position of the exhaust gas recirculation (EGR) valve and thereby the amount of EGR and boost pressure.

In a particular embodiment, metering is controlled in response to the quantity of nitrogen oxides in the exhaust gas determined either directly (using a suitable $NO_x$ sensor) or indirectly, such as using pre-correlated look-up tables or maps—stored in the control means—correlating any one or more of the abovementioned inputs indicative of a condition of the engine with predicted $NO_x$ content of the exhaust gas. The metering of the nitrogenous reductant can be arranged such that 60% to 200% of theoretical ammonia is present in exhaust gas entering the SCR catalyst calculated at 1:1

$NH_3/NO$ and 4:3 $NH_3/NO_2$. The control means can comprise a pre-programmed processor such as an electronic control unit (ECU).

In a further embodiment, a diesel oxidation catalyst for oxidizing nitrogen monoxide in the exhaust gas to nitrogen dioxide can be located upstream of a point of metering the nitrogenous reductant into the exhaust gas. In one embodiment, the diesel oxidation catalyst is adapted to yield a gas stream entering the SCR zeolite catalyst having a ratio of NO to $NO_2$ of from about 4:1 to about 1:3 by volume, e.g. at an exhaust gas temperature at oxidation catalyst inlet of 250° C. to 450° C. In another embodiment, the NO to $NO_2$ is maintained at a ratio of about 1:2 to about 1:5 by volume. The diesel oxidation catalyst can include at least one platinum group metal (or some combination of these), such as platinum, palladium, or rhodium, coated on a flow-through monolith substrate. In one embodiment, the at least one platinum group metal is platinum, palladium, or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

In a further embodiment, a suitable filter substrate is located between the diesel oxidation catalyst and the SCR catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the SCR catalyst blend. Alternatively, if the filter is un-catalyzed, the means for metering nitrogenous reductant can be located between the diesel oxidation catalyst and the filter.

In a further embodiment, the catalyst blend for use in the present invention is coated on a filter located downstream of the oxidation catalyst. Where the filter includes the catalyst blend, the point of metering the nitrogenous reductant is preferably located between the oxidation catalyst and the filter.

In a further aspect, there is provided a vehicular lean-burn engine comprising an exhaust system according to the present invention. The vehicular lean burn internal combustion engine can be a diesel engine, a lean-burn gasoline engine or an engine powered by liquid petroleum gas or natural gas.

As used herein, the term "consists essentially of" with respect to a catalytic composition means that the composition contains the named catalytic components but does not contain additional components that materially affect the basic and novel characteristics of the claimed invention. That is, the catalytic composition does not include additional components that would otherwise serve as a catalyst for the intended reaction or serve to enhance the basic catalytic nature of the claimed catalyst.

EXAMPLES

Example 1

Catalyst Preparation

A catalyst composition was prepared by blending iron exchanged MFI aluminosilicate with a $V_2O_5$—$TiO_2/WO_3$ suspension. The resulting composition contained about 20 weight percent iron exchanged MFI aluminosilicate based on the combined weight of the iron exchanged MFI aluminosilicate and $V_2O_5$—$TiO_2/WO_3$ solids. A similar process was followed to prepare a catalyst containing 5 weight percent iron exchanged MFI aluminosilicate; a catalyst containing 20 weight percent iron exchanged FER aluminosilicate; a catalyst containing 5 weight percent iron exchanged FER aluminosilicate; a catalyst containing 20 weight percent a BEA ferrosilicate; and a catalyst containing 10 weight percent a BEA ferrosilicate.

These catalysts blends were formed into an extrudable mass, kneaded, strained, and then extruded to form 1 inch diameter×140 mm honeycomb bricks.

Additionally, catalyst material containing 20 weight percent iron exchanged MFI aluminosilicate was formed into an extrudable mass, kneaded, strained, and then extruded to form 10.5 inch diameter × 5.0 inch 400/11 honeycomb bricks and also 10.5 inch diameter×7.0 inch 400/11 honeycomb bricks.

Example 2

Catalyst Performance (Varying $NO_2$ Levels)

An extruded 1 inch diameter×140 mm honeycomb brick containing a blend of iron exchanged MFI aluminosilicate and $V_2O_5$—$TiO_2/WO_3$ (20 wt. % Fe-MFI), was exposed to a simulated diesel engine exhaust gas at a space velocity of about 60,000/hour. The simulated exhaust gas contained about 9.3 wt. % $O_2$, about 7.0 wt. % $H_2O$, about 100 ppm $NO_x$ (NO only) about 100 ppm $NH_3$, and the balance $N_2$. The catalyst's capacity for $NO_x$ conversion was determined at temperatures of 180, 215, 250, 300, 400, and 500° C.

For comparison, a similar catalytic brick was prepared using only $V_2O_5$—$TiO_2/WO_3$. The comparative sample was also tested for $NO_x$ conversion under similar conditions.

The $NO_x$ conversion data for these fresh samples (i.e., non-aged) is provided in FIG. 1. Here, the data shows that at 0% $NO_2$, a catalyst based on a blend of Fe-MFI and $V_2O_5$—$TiO_2/WO_3$ results in better of NOx conversion at high temperatures compared to a catalyst containing only $V_2O_5$—$TiO_2/WO_3$.

Figure 2:
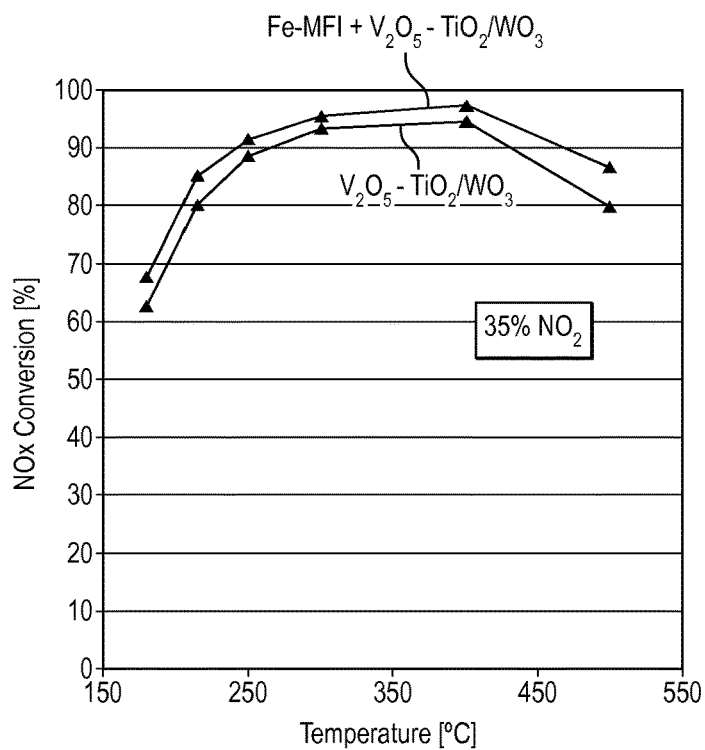
FIG. 2 is a graph depicting $NO_x$ conversion data for a fresh catalyst according to an embodiment of the present invention and comparative data for a catalyst known in the prior art.
Figure 3:
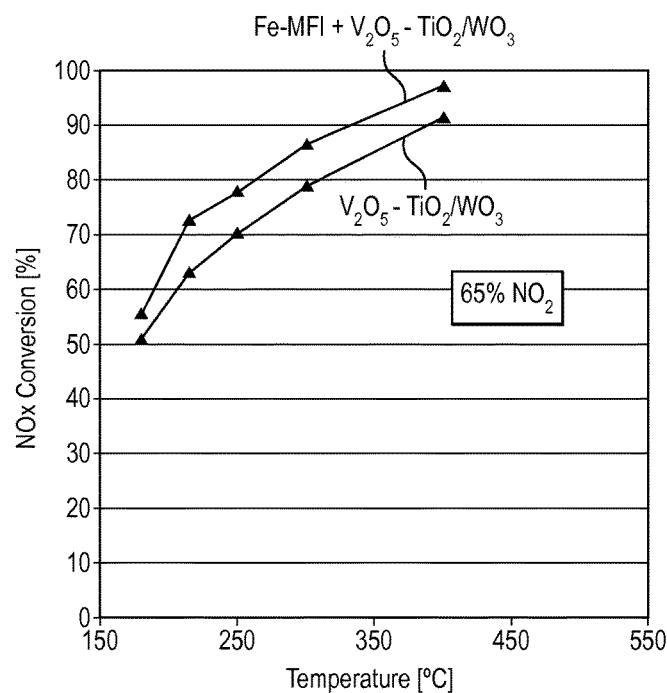
FIG. 3 is a graph depicting $NO_x$ conversion data for a fresh catalyst according to an embodiment of the present invention and comparative data for a catalyst known in the prior art.

This test was repeated except that the NOx stream was adjusted to contain 35 weight percent $NO_2$. The $NO_x$ conversion data for these fresh samples is provided in FIG. 2. Here, the data shows that at 35% $NO_2$, a catalyst based on a blend of Fe-MFI and $V_2O_5$—$TiO_2/WO_3$ results in better of NOx conversion compared to a catalyst containing only $V_2O_5$—$TiO_2/WO_3$ across a wide range of temperatures. This test was repeated again except that the NOx stream was adjusted to contain 65 weight percent $NO_2$. The $NO_x$ conversion data for these fresh samples is provided in FIG. 3. Here, the data shows that at 65% $NO_2$, a catalyst based on a blend of Fe-MFI and $V_2O_5$—$TiO_2/WO_3$ results in better of NOx conversion compared to a catalyst containing only $V_2O_5$—$TiO_2/WO_3$ across a wide range of temperatures.

Example 3

Catalyst Performance (Post-hydrothermal Aging)

An extruded 1 inch diameter×140 mm honeycomb fresh brick containing a blend of iron exchanged MFI aluminosilicate and $V_2O_5$—$TiO_2/WO_3$ (20 weight percent Fe-MFI), was aged for 100 hours at 580° C. Three additional fresh bricks were also aged, each at one of the following conditions: 100 hours at 580° C. and 10% $H_2O$; 100 hours at 650° C.; and 100 hours at 650° C. and 10% $H_2O$.

For comparison, two similar catalytic bricks were prepared using only $V_2O_5$—$TiO_2$/$WO_3$. Each of the comparative samples were aged at one of the following conditions: 100 hours at 580° C. and 100 hours at 650° C.

All of the bricks were exposed to a simulated diesel engine exhaust gas at a space velocity of about 60,000/hour. The simulated exhaust gas contained about 9.3 wt. % $O_2$, about 7.0 wt. % $H_2O$, about 100 ppm $NO_x$ (NO only) about 100 ppm $NH_3$, and the balance $N_2$. The catalyst's capacity for $NO_x$ conversion was determined at temperatures of 180, 215, 250, 300, 400, and 500° C.

Figure 4:
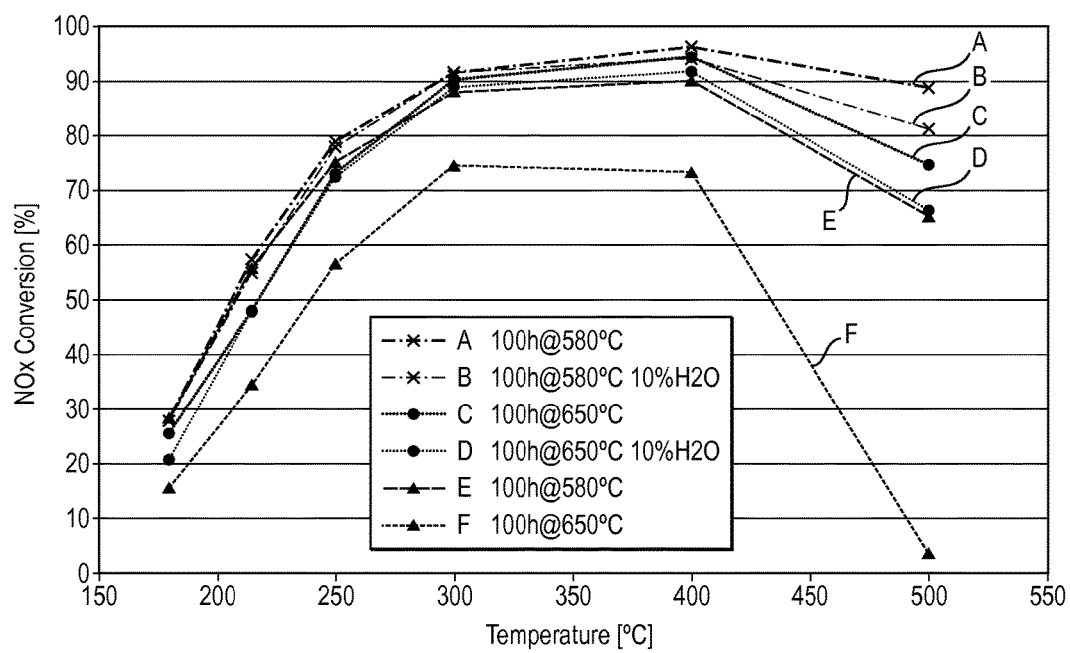
FIG. 4 is a graph depicting $NO_x$ conversion data for aged catalysts according to an embodiment of the present invention and comparative data for aged catalysts known in the prior art.

The $NO_x$ conversion data for these aged samples is provided in FIG. 4. Here, the data shows that the catalyst based on a blend of Fe-MFI and $V_2O_5$—$TiO_2$/$WO_3$ were much more hydrothermally stable compared to catalyst containing only $V_2O_5$—$TiO_2$/$WO_3$, particular under harsh aging conditions.

Example 4

Comparative Catalyst Performance

An extruded 1 inch diameter×140 mm honeycomb brick containing a blend of iron exchanged MFI aluminosilicate and $V_2O_5$—$TiO_2$/$WO_3$ (20 weight percent Fe-MFI), was exposed to a simulated diesel engine exhaust gas at a space velocity of about 60,000/hour. The simulated exhaust gas contained about 9.3 wt. % $O_2$, about 7.0 wt. % $H_2O$, about 100 ppm $NO_x$ (65 weight percent $NO_2$), about 100 ppm $NH_3$, and the balance $N_2$. The catalyst's capacity for $NO_x$ conversion was determined at temperatures of 180, 215, 250, 300, 400, and 500° C.

Another extruded 1 inch diameter×140 mm honeycomb brick, but containing a blend of iron exchanged FER aluminosilicate and $V_2O_5$—$TiO_2$/$WO_3$ (20 weight percent Fe-FER), was exposed to a simulated diesel engine exhaust gas at a space velocity of about 60,000/hour. The simulated exhaust gas contained about 9.3 wt. % $O_2$, about 7.0 wt. % $H_2O$, about 100 ppm $NO_x$ (65 weight percent $NO_2$), about 100 ppm $NH_3$, and the balance $N_2$. The catalyst's capacity for $NO_x$ conversion was determined at temperatures of 180, 215, 250, 300, 400, and 500° C.

Figure 5:
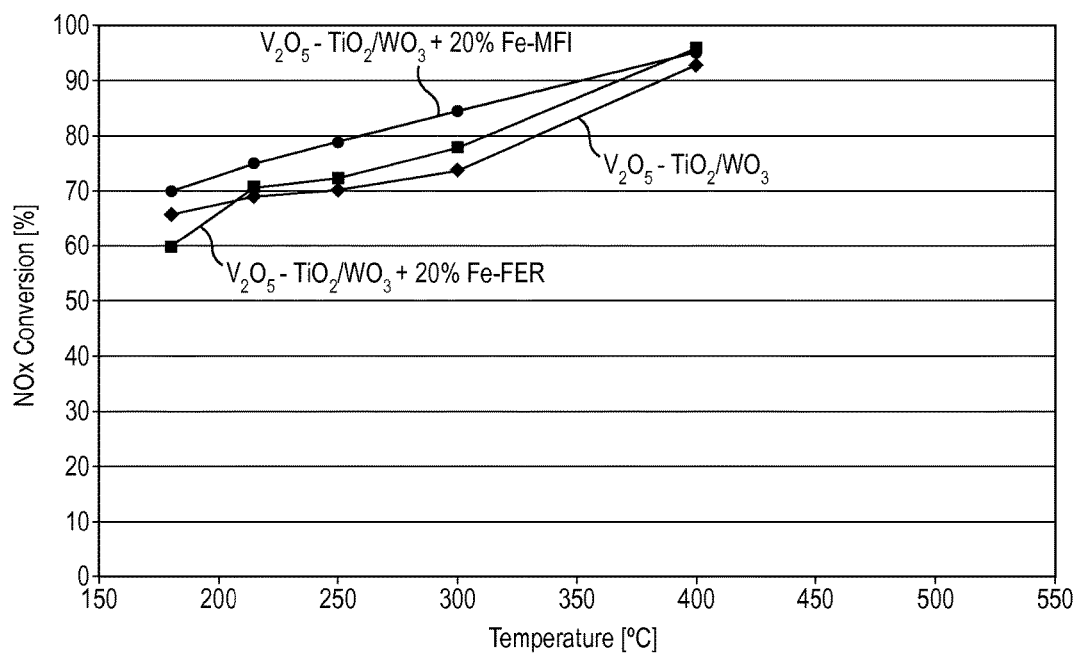
FIG. 5 is a graph depicting $NO_x$ conversion data for two different catalysts according to an embodiment of the present invention and comparative data for a catalyst known in the prior art.

For comparison, a similar catalytic brick was prepared using only $V_2O_5$—$TiO_2$/$WO_3$. The comparative sample was also tested for $NO_x$ conversion under similar conditions. The $NO_x$ conversion data for these samples is provided in FIG. 5. Here, the data shows that at 65% $NO_2$, a catalyst based on a blend of Fe-MFI and $V_2O_5$—$TiO_2$/$WO_3$ results in better of NOx conversion at high temperatures compared to a catalyst containing a blend of Fe-FER and $V_2O_5$—$TiO_2$/$WO_3$, and that a catalyst based on a blend of Fe-MFI and $V_2O_5$—$TiO_2$/$WO_3$ results in better of NOx conversion at high temperatures compared to a catalyst containing only $V_2O_5$—$TiO_2$/$WO_3$.

The invention claimed is:

1. An SCR catalyst composition for treating exhaust gas, the SCR catalyst composition comprising a blend of a first component and second component,
   wherein the first component is an Fe ion-exchanged aluminosilicate molecular sieve component having the MFI framework, and the second component is tungsten oxide supported on a titanium oxide support and mixed with vanadium oxide;
   wherein the catalyst composition comprises about 15 to about 25 weight percent of the first component and about 75 to about 85 weight percent of the second component based on the total weight of catalytically active components in the blend.

2. The catalyst of claim 1, wherein molecular sieve contains in a range of from about 1 to about 10 weight percent ion exchanged Fe.

3. The catalyst composition of claim 1, wherein the second component further comprises iron vanadate.

4. The catalyst composition of claim 1, wherein the blend comprises from about 0.5 to about 5 weight percent of the vanadium oxide based on the weight of the first and second components.

5. A catalytic washcoat comprising the catalyst composition of claim 1, further comprising one or more filler, binder, processing aide, water, or dopant.

6. A catalytic article comprising a substrate coated with or incorporating the catalyst composition of claim 1, wherein the substrate is a metal flow-through substrate, a ceramic flow-through substrate, a wall-flow filter, a sintered metal filter, a partial filter, or an extruded catalyst honeycomb.

7. A system for treating exhaust gas comprising a selective catalytic reduction (SCR) catalyst upstream of an ammonia slip catalyst (ASC), wherein said SCR catalyst comprises the catalyst composition of claim 1.

8. The system of claim 7, further comprising a diesel oxidation catalyst having a platinum group metal disposed upstream of said selective catalytic reduction catalyst.

9. A method for treating an exhaust gas comprising the steps of:
   contacting an exhaust gas stream containing NOx and $NH_3$ in the presence of the catalyst of claim 1; and
   converting at least a portion of said NOx to $N_2$.

10. The method of claim 9, wherein said exhaust gas comprises NO to $NO_2$ present in a ratio of NO to $NO_2$ ranging from about 4:1 to about 1:3 by volume.

* * * * *